United States Patent Office 3,547,995
Patented Dec. 15, 1970

3,547,995
PERFLUOROALKYL ETHER AMIDOAMINE OXIDES
Philip Lee Bartlett, Wilmington, Del., assignor to E. I. du Pont de Nemours and Company, Wilmington, Del., a corporation of Delaware
No Drawing. Continuation-in-part of application Ser. No. 621,157, Mar. 7, 1967. This application Feb. 16, 1968, Ser. No. 705,932
Int. Cl. C07c 97/02
U.S. Cl. 260—561           5 Claims

ABSTRACT OF THE DISCLOSURE

Perfluoroalkyl ether amidoamine oxides of the formula $R_fO(C_3F_6O)_nCF(CF_3)CON(R')Q$ in which Q is selected from certain radicals containing an amine oxide group and 3-18 carbons are useful as surface active agents for water or antiwetting agents and are noncorrosive to steel.

CROSS-REFERENCE TO RELATED APPLICATION

This is a continuation-in-part of application Serial No. 621,157, filed Mar. 7, 1967, now abandoned.

BACKGROUND OF THE INVENTION

In U.S. Pat. 2,169,976 to Guenther et al. tertiary amine oxides of the formula

wherein $R^1$ is hydrogen or an aliphatic or aromatic radical, $R^2$ and $R^3$ are aliphatic or aromatic radicals, and at least one of the radicals contains an aliphatic chain of at least 8 carbon atoms, are disclosed as being wetting, cleansing, dispersing and like agents for aqueous baths. In U.S. Pat. 2,764,603 Ahlbrecht teaches that perfluoroalkylamidopolymethylene dialkylamines of the formula

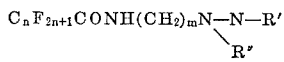

are surface active agents for oils and waxes but are relatively insoluble in water.

DESCRIPTION OF THE INVENTION

It has now been discovered that certain perfluoroalkyl ether amidoamine oxides are useful as surface active agents for water or antiwetting agents and have corrosion inhibiting properties toward steel. These compounds are of the formula $R_fO(C_3F_6O)_nCF(CF_3)CON(R')Q$ wherein $R_f$ is a perfluoroalkyl group of 1-6 carbons, $n$ is an integer from 0-8, $R'$ is H or an alkyl of 1-6 carbons, and Q is a radical containing an amine oxide group and 3-18 carbons of the formula (1)

wherein $p$ is an integer from 1-12, $R^2$ and $R^3$ are alkyl groups of 1-4 carbons, (2)

wherein Y is a divalent group of the formula $-(CH_2)_4-$, $-(CH_2)_5-$ or $-(CH_2)_2O(CH_2)_2-$, (3)

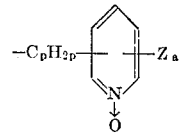

wherein Z is halogen or methyl and $a$ is an integer from 0-3, (4)

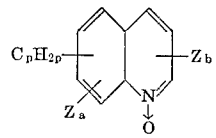

wherein $b$ and $a+b$ are integers from 0-3, (5)

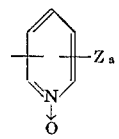

or (6)

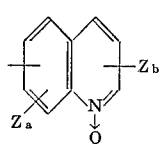

The starting materials for preparing the products of this invention are the perfluoroalkyl ether acid fluorides of the formula $R_fO(C_3F_6O)_nCF(CF_3)CFO$. These acid fluorides are available from two sources, polymerization of hexafluoropropylene oxide and polymerization of mixtures of hexafluoropropylene and oxygen.

The acid fluorides prepared by the polymerization of hexafluoropropylene oxide are taught by Moore et al. in U.S. Pat. 3,250,808 and have the structure $$R_fO[CF(CF_3)-CF_2O]_nCF(CF_3)CFO$$

If hexafluoropropylene oxide alone is polymerized, the products are n-$C_3F_7O[CF(CF_3)CF_2O]_nCF(CF_3)CFO$ as described more fully by Moore in Canadian Pat. 725,740. If the polymerization is carried out in the presence of carbonyl fluoride ($COF_2$) or a perfluoroacid fluoride of the formula $F(CF_2)_mCFO$, as described more fully in French Pat. 1,362,548, the product is of the formula $$F(CF_2)_mCF_2O[CF(CF_3)-CF_2O]_nCF(CF_3)CFO$$

as described by Selman in U.S. Pat. 3,274,239, the product is of the formula

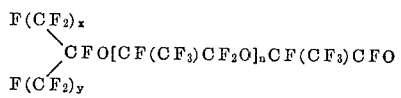

where $x$ and $y$ are 1-4 and the total of $x+y$ is 2-5. Thus, $R_f$ may be branched or straight chain perfluoroalkyl group of 1-6 carbon atoms.

The acid fluorides prepared by polymerization of mixtures of hexafluoropropylene and oxygen are taught by Pasetti, Sianesi and Corti in Die Makromolekulare Chemie, 86, pages 308–311 (1965); Sianesi and Fontanelli in Die Makromolekulare Chemie, 102, pages 115–124 (1967);

and French Pat. 1,434,537. The polymerization is carried out at temperatures of about −100° C. to 25° C. in the presence of ultraviolet radiation. Unlike the products obtained from the polymerization of hexafluoropropylene oxide, these polymers have backbones which are not in a regular head to tail arrangement; they contain both head to head and tail to tail as well as head to tail arrangements. These polymeric acid fluorides are thus best represented by the formula $R_fO(C_3F_6O)_nCF(CF_3)CFO$. Generically, the polymers from hexafluoropropylene oxide and hexafluoropropylene-oxygen mixtures are best represented by this more general formula.

The perfluoroalkyl ether amidoamine oxides of this invention are prepared by first converting the perfluoroalkyl ether acid fluoride to a corresponding alkyl perfluoroalkyl ether ester and preferably the methyl ester of the formula $R_fO(C_3F_6O)_nCF(CF_3)CO_2CH_3$ or a corresponding perfluoroalkyl ether amide of the formula $$R_fO(C_3F_6O)_nCF(CF_3)CONHR'$$

in which R′ is hydrogen or an alkyl of 1–6 carbon atoms. The esters are prepared by esterification of the corresponding acid fluoride using standard methods, for example reaction of the acid fluoride with an alkanol such as methanol as is taught by Diesslin et al. in U.S. Pat. 2,567,011. Preferably, the esterification is carried out by reacting the perfluoroalkyl ether acid fluoride with excess methanol at 10–20° C., optionally in an inert solvent, in the presence of sufficient pyridine to consume the hydrogen fluoride formed. In place of methanol one can also use ethanol, propanol, butanol or the like equally well. The amides are prepared by reaction of the corresponding acid fluoride with ammonia or an alkylamine of the formula R′NH₂ as also taught in the Diesslin et al. patent.

The products of this invention are of the formula $$R_fO(C_3F_6O)_nCF(CF_3)CON(R')Q$$

When Q is

wherein p is an integer from 2–12 and R² and R³ are alkyl groups of 1–4 carbons, the products are readily to form a dialkyl-N-tert.-aminoalkyl perfluoroalkyl ether ester with a diamine of the formula

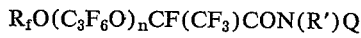

to form a dialkyl-N-tert.-aminoalkyl perfluoroalkyl ether amide of the formula

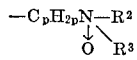

by well known techniques such as those described by Ahlbrecht in U.S. Pat. 2,764,603. The amide is then oxidized to the amine oxide using an oxidizing agent such as hydrogen peroxide, as described by Guenther et al. in U.S. Pat. 2,169,976.

A large number of diamines of the type

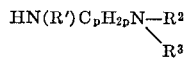

in which p is 2–12 are known. Some useful examples include: $NH_2(CH_2)_2N(CH_3)_2$, $NH_2(CH_2)_2N(C_2H_5)_2$,
$NH'(CH_2)_2N(C_3H_7)_2$, $NH_2(CH_2)_2N(C_4H_9)_2$
$NH_2(CH_2)_3N(CH_3)_2$, $NH_2(CH_2)_3N(C_2H_5)_2$
$CH_3NH(CH_2)_2N(CH_3)_2$, $CH_3NH(CH_2)_2N(C_2H_5)_2$
$C_2H_5NH(CH_2)_2N(C_2H_5)_2$, $NH_2(CH_2)_3N(C_3H_7)_2$
$NH_2(CH_2)_3N(C_4H_9)_2$, $NH_2(CH_2)_4N(CH_3)_2$,
$NH_2(CH_2)_4N(C_2H_5)_2$, $CH_3NH(CH_2)_4N(CH_3)_2$
$NH_2(CH_2)_5N(CH_3)_2$, $NH_2(CH_2)_5N(C_2H_5)_2$,
$NH_2(CH_2)_6N(C_2H_5)_2$, $NH_2(CH_2)_6N(C_3H_7)_2$
$NH_2(CH_2)_8N(C_3H_7)_2$, $NH_2(CH_2)_8N(C_4H_9)_2$
$NH_2(CH_2)_{10}N(C_3H_7)_2$
and
$NH_2(CH_2)_{12}N(C_3H_7)_2$ If the desired amines of the formula

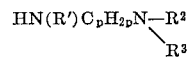

are not available, primary diamines of the formula $$NH_2C_pH_{2p}NH_2$$

may be used. The n-aminoalkyl perfluoroalkyl ether amide product obtained by reacting the perfluoroalkyl ether ester with the primary diamine is then alkylated with several moles of alkyl halide, sulfate or sulfonate to form the tertiary amine, followed by oxidation to the amine oxide as before. Alternatively, the aminoalkyl amide may be alkylated by other procedures such as reductive alkylation with formaldehyde and formic acid, followed by oxidation to the amine oxide.

Another route to the products in which Q is

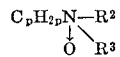

and p is 2–12 is to react the methyl fluorocarbon ether ester with an alkaolamine of the formula $$NR(R')C_pH_{2p}OH$$

to form a perfluoroalkyl ether amide of the formula $$R_f(C_3F_6O)_nCF(CF_3)CON(R')—C_pH_{2p}OH$$

The amide is then treated with a halogenating agent, for example hydrogen chloride, thionyl chloride or the like, to form the N-haloalkyl perfluoroalkyl ether amide which is then treated with a secondary amine of the formula

followed by oxidation of the resulting tertiary amine of the formula

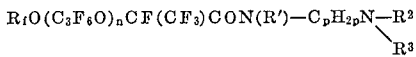

to the corresponding amine. Suitable alkanolamines include ethanolamine, propanolamine, butanolamine, octanolamine and dodecanolamine.

A special procedure is required to obtain the products in which Q is

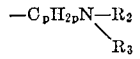

and p is 1. They are readily prepared by reaction of the perfluoroalkyl ether amide of the formula $$R_fO(C_3F_6O)_nCF(CF_3)CONHR'$$

with formaldehyde and hydrogen chloride to give an N-chloromethyl perfluoroalkyl ether amide of the formula $$R_fO(C_3F_6O)_nCF(CF_3)CON(R')CH_2Cl$$

which is then converted to the tertiary amine by reaction with a secondary amine of the formula

The tertiary amine is then oxidized as before.
When Q is

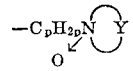

wherein p is an integer from 1–12, and Y is $—(CH_2)_4—$, $—(CH_2)_5—$ or $—(CH_2)_2O(CH_2)_2—$ the products of this invention are prepared by the same general methods as described above. One procedure is by reaction of a diamine of the formula

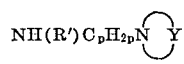

with the methyl perfluoroalkyl ether ester and oxidation of the resulting product to the amine oxide. They can also be prepared by reaction of the N-haloalkyl perfluoroalkyl ether amides described above, including the N-chloromethyl amides, with the cyclic amine of the formula

to form the tertiary amine which is then oxidized to the amine oxide.

Useful examples of diamines of the formula

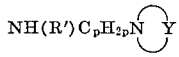

include N-(2'-aminoethyl)piperidine, N-(4'-aminobutyl) piperidine, N - (2' - aminoethyl)morpholine and N-(2'-aminoethyl)pyrrolidine. Useful examples of cyclic aliphatic amines of the formula

which may be reacted with the haloamides include piperidine, pyrrolidine and morpholine.

When Q is —$C_pH_{2p}Q'$ wherein $p$ is an integer from 1–12 and Q' is

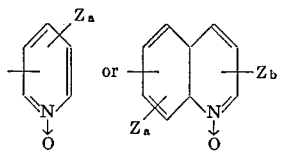

wherein Z is a substituent such as halogen or methyl, and $a$, $b$ and $a+b$ are integers from 0–3, the products of this invention are usually prepared by reaction of the methyl perfluoroalkyl ether esters described above with an aminoalkylpyridine of the formula

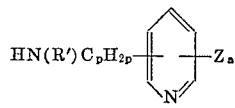

or an aminoalkylquinoline of the formula

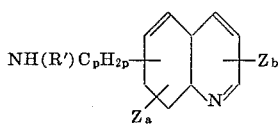

followed by oxidation as above.

Useful examples of aminoalkyl pyridines include 2-aminomethyl pyridine, 2-(2'-aminoethyl)pyridine, 3-(2'-aminoethyl)pyridine, 3-aminomethyl pyridine, 2,6-dichloro-3-aminomethyl pyridine, 2-methyl-3-(2'-aminoethyl)pyridine, 3-(3'-aminobutyl)pyridine, 4-aminomethyl pyridine, and 4-(2'-aminoethyl)pyridine. Suitable aminoalkylquinolines include 2-, 3-, 4-, 5-, 6-, 7- and 8-aminomethylquinolines, 2-, 3-, 4-, 5-, 6-, 7- and 8-(2'-aminoethyl)quinolines, 2-,3-, 4-, 5-, 6-, 7- and 8-(4'-aminobutyl)quinolines, and 2-, 3-, 4-, 5-, 6-, 7- and 8-(3'-methylaminopropyl) quinolines.

When Q is

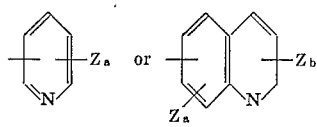

wherein Z is halogen or methyl and $a$, $b$ and $a+b$ are integers from 0–3, the products of this invention are prepared by reaction of the methyl perfluoroalkyl ether ester described above with an aminopyridine of the formula

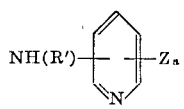

or an aminoquinoline of the formula

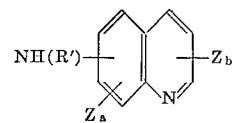

followed by oxidation to the amine oxide as before. Some useful aminopyridines include 2-aminopyridine, the 3-, 4-, 5- and 6-methyl-2-aminopyridines, the 3-, 4-, 5- and 6-chloro-2-aminopyridines, 3-aminopyridine, 2-chloro-6-methyl-3-aminopyridine, 4-aminoquinolines, the dichloro-4-aminopyridines, and the like. Suitable aminoquinolines include the 2-, 3-, 4-, 5-, 6-, 7- and 8-aminoquinolines, the chloroaminoquinolines, the methylaminoquinolines, and the like.

All of the above procedures are generally well known in the art. With the exception of the oxidation reactions, a convenient inert solvent such as ethers, hydrocarbons, halogenated aromatic hydrocarbons, or alcohols may be used at a temperature between 0° C. and the reflux temperature of the system. Alternatively, particularly when the product is a liquid, the methyl fluorocarbon ether ester may be heated alone with the amine, allowing the methyl formed to distill from the system.

In the oxidation reactions, the solvent must be stable to the oxidizing agent. When convenient, water is a useful solvent. Otherwise, solvents such as acetic acid may be useful. The oxidations usually require somewhat elevated temperatures, about 75° C. being preferred. Products are recovered in the usual manner.

While specific schemes have been described for preparing the compounds of this invention, it is not intended that this invention be limited to any particular method of synthesis. Other methods may occur to those skilled in the art.

When $n$ is 0–1, the products of this invention of the formula $R_fO(C_3F_6O)_nCF(CF_3)CON(R')Q$ are useful as surface active agents in aqueous systems, for example as emulsifying agents, dispersants, wetting agents and the like. These products are particularly useful as dispersing agents for aqueous emulsion polymerization. They are useful as surface active agents at concentrations of about 0.001–10% by weight of the aqueous system. Compounds in which $n$ is 2 or greater are insufficiently soluble in water to be useful as surface active agents in aqueous systems.

All of the products of this invention, that is, those in which $n$ is 0–8, are effective as anticorrosion agents for steel. The products wherein $n$ is 0–1 are particularly useful as surface active agents in applications where they come in contact with steel such as in steel treating processes, for example in pickling baths. Those products wherein $n$ is 2–8 are useful for other purposes. For example, they are useful as antiwetting agents in applications requiring mold release agents, release agents for glass, and flotation agents. The preferred products of this invention are those obtained from the polymerization of hexafluoropropylene oxide and hence of the formula

The following examples, illustrating the preparation and utility of the novel compounds of this invention, are given without any intention that the invention be limited thereto. All parts and percentages are by weight.

EXAMPLE 1

Perfluoroalkyl ether esters were prepared as follows:
(A) A solution of 450 parts of

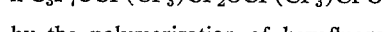

prepared by the polymerization of hexafluoropropylene oxide and 10 parts of pyridine in 500 parts of anhydrous diethyl ether was cooled to 10–15° C. under anhydrous conditions. Then 100 parts of anhydrous methanol was added over a period of one hour with agitation while maintaining the temperature of the reaction mass at 10–15° C.

Agitation was continued for four hours at 10–15° C., then the pyridine hydrofluoride was collected by filtration and the filtrate was washed twice with 250 parts of water, twice with 250 parts of 5% aqueous sodium bicarbonate solution and finally five times with water until the final wash water was neutral. The ether solution was dried over anhydrous sodium sulfate and the ether was evaporated. The residue was distilled under reduced pressure giving 430 parts (93.3% of theory) of n-(C$_3$F$_7$OCF(CF$_3$)CF$_2$OCF(CF$_3$)CO$_2$CH$_3$ boiling point 43° C./9 mm. Hg.

(B) Using essentially the same procedure, the ester, n-C$_3$F$_7$OCF(CF$_3$)CO$_2$CH$_3$, boiling point 109–110° C./760 mm. Hg, was prepared in 75.1% yield from 200.0 parts of acid fluoride and 50.0 parts of methanol. Likewise the methyl esters, CF$_3$OCF(CF$_3$)CO$_2$CH$_3$, CF$_3$OCF(CF$_3$)CF$_2$OCF(CF$_3$)CO$_2$CH$_3$
C$_2$F$_5$OCF(CF$_3$)CO$_2$CH$_3$
C$_2$F$_5$OCF(CF$_3$)CF$_2$OCF(CF$_3$)CO$_2$CH$_3$
(CF$_3$)$_2$CFOCF(CF$_3$)CO$_2$CH$_3$
(CF$_3$)$_2$CFOCF(CF$_3$)CF$_2$OCF(CF$_3$)CO$_2$CH$_3$
n-C$_4$F$_9$OCF(CF$_3$)CO$_2$CH$_3$
n-C$_4$F$_9$OCF(CF$_3$)CF$_2$OCF(CF$_3$)CO$_2$CH$_3$
n-C$_6$F$_{13}$OCF(CF$_3$)CO$_2$CH$_3$
n-C$_6$F$_{13}$OCF(CF$_3$)CF$_2$OCF(CF$_3$)CO$_2$CH$_3$
n-C$_3$F$_7$O[CF(CF$_3$)CF$_2$O]$_2$CF(CF$_3$CO$_2$CH$_3$ and n-C$_3$F$_7$[CF(CF$_3$)CF$_2$O]$_8$CF(CF$_3$)CO$_2$CH$_3$ can be prepared from the corresponding acid fluorides by the same procedure.

EXAMPLE 2

Perfluoroalkyl ether amides were prepared as follows:
(A) A solution of 10 parts of n-(C$_3$F$_7$OCF(CF$_3$)CF$_2$OCF(CF$_3$)CO$_2$CH$_3$ in 250 parts of anhydrous diethyl ether was cooled to 10–15° C. under anhydrous conditions and a solution of 22.5 parts of 3-dimethylaminopropylamine in 50 parts of anhydrous diethyl ether was added over a one hour period with agitation. Agitation was continued for four hours at 10–15° C. The ether and excess amine were evaporated at reduced pressure (50° C./5 mm. Hg) and the residue filtered, giving 112.4 parts (98.6% of theory) of n-C$_3$F$_7$OCF(CF$_3$)CF$_2$OCF(CF$_3$)CONH(CH$_2$)$_3$N(CH$_3$)$_2$ as a light yellow liquid.

*Analysis.*—Calcd for C$_{14}$H$_{13}$F$_{17}$N$_2$O$_3$ (percent): F, 55.4; N, 4.83. Found (percent): F, 55.3; N, 5.05.

(B) Using the same procedure, the amide, n-C$_3$F$_7$OCF(CF$_3$)CONH(CH$_2$)$_3$N(CH$_3$)$_2$ was prepared.

Using the same procedure, n-C$_3$OCF(CF$_3$)CF$_2$OCF(CF$_3$)CO$_2$CH$_3$ can be reacted with NH$_2$(CH$_2$)$_5$N(CH$_3$)$_2$ to form n-C$_3$OCF(CF$_3$)CF$_2$OCF(CF$_3$)CONH(CH$_2$)$_5$N(CH$_3$)$_2$ with

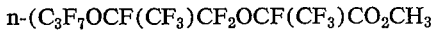

to form

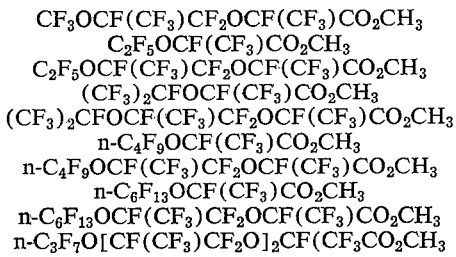

with

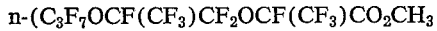

to form

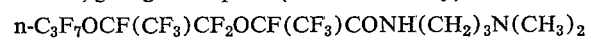

or with

to form

CF$_3$OCF(CF$_3$)CO$_2$CH$_3$ can be reacted with (CH$_3$)$_2$N(CH$_2$)$_3$NH$_2$ to form

CF$_3$OCF(CF$_3$)CONH(CH$_2$)$_3$N(CH$_3$)$_2$

C$_2$F$_5$OCF(CF$_3$)CF$_2$OCF(CF$_3$)CO$_2$CH$_3$ can be reacted with NH$_2$(CH$_2$)$_3$N(CH$_3$)$_2$ to form

C$_2$F$_5$OCF(CF$_3$)CF$_2$OCF(CF$_3$)CONH(CH$_2$)$_3$N(CH$_3$)$_2$ and (CF$_3$)$_2$CFOCF(CF$_3$)CF$_2$OCF(CF$_3$)CO$_2$CH$_3$ can be reacted with NH$_2$(CH$_2$)$_2$N(CH$_3$)$_2$ to form (CF$_3$)$_2$CFOCF(CF$_3$)CF$_2$OCF(CF$_3$)CONH(CH$_2$)$_2$N(CH$_3$)$_2$ (C) Using the same procedure, 51.0 parts of n-C$_3$F$_7$OCF(CF$_3$)CF$_2$OCF(CF$_3$)CO$_2$CH$_3$ in 200 parts of diethyl ether was reacted with 18.8 parts of 2-aminopyridine to give 56.0 parts (98% theory) of

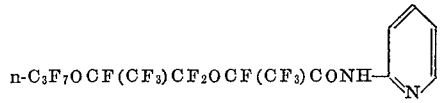

In the same manner, n-C$_4$F$_9$OCF(CF$_3$)CO$_2$CH$_3$ can be reacted with 2-aminopyridine to give

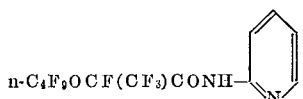

(D) Using essentially the same procedure, 51.0 parts of n-C$_3$F$_7$OCF(CF$_3$)CF$_2$OCF(CF$_3$)CO$_2$CH$_3$ was reacted with 28.8 parts of 8-aminoquinoline to give 60.4 parts (97% of theory) of

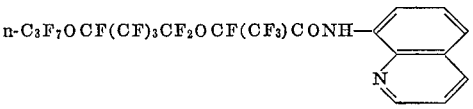

(E) Using the procedure of part (A), n-C$_3$F$_7$O[CF(CF$_3$)CF$_2$O]$_2$CF(CF$_3$)CO$_2$CH$_3$ was reacted with NH$_2$(CH$_2$)$_3$N(CH$_3$)$_2$ to give
n-C$_3$F$_7$O[CF(CF$_3$)CF$_2$O]$_2$CF(CF$_3$)CONH(CH$_2$)$_3$N(CH$_3$)$_2$ (F) Using the procedure of part (A), n-C$_3$F$_7$O[CF(CF$_3$)CF$_2$O]$_8$CF(CF$_3$)CO$_2$CH$_3$ was reacted with NH$_2$(CH$_2$)$_3$N(CH$_3$)$_2$ to give
n-C$_3$F$_7$O[CF(CF$_3$)CF$_2$O]$_8$CF(CF$_3$)CONH(CH$_2$)$_3$N(CH$_3$)$_2$

EXAMPLE 3

Perfluoroalkyl ether amide amine oxides were prepared as follows:
(A) A mixture of 100 parts of n-C$_3$F$_7$OCF(CF$_3$)CF$_2$OCF(CF$_3$)CONH(CH$_2$)$_3$N(CH$_3$)$_2$ 75 parts of 30% hydrogen peroxide and 200 parts of water was heated at 75° C. for four hours. The water and excess peroxide were removed by evaporation upon heating gently with a current of air over the solution to give 101.9 parts (99.4% of theory) of

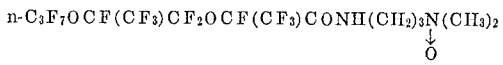

as a viscous liquid.

*Analysis.*—Calc'd for $C_{14}H_{13}F_{17}N_2O_4$ (percent): F, 54.2; N, 4.71. Found (percent): F, 54.2; N, 4.68.

(B) Using the above procedure, 20.0 parts of $$n\text{-}C_3F_7OCF(CF_3)CONH(CH_2)_3N(CH_3)_3$$

was oxidized with 25.0 parts of 30% hydrogen peroxide in 50.0 parts of water to give 20.2 parts (98% of theory) of

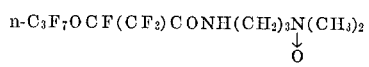

(C) Using the same procedure, 10.0 parts of

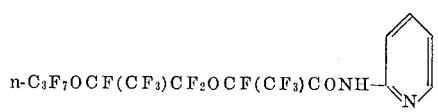

was axidized with 10.0 parts of 30% hydrogen peroxide in 50.0 parts of water to give 10.2 parts (99% of theory) of

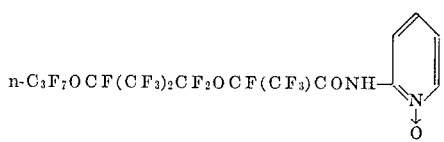

as a viscous liquid.

(D) Using the same procedure, 10.0 parts of

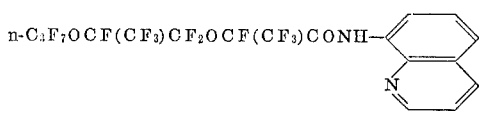

was oxidized with 10.0 parts of 30% hydrogen peroxide in 50.0 parts of water to give 10.1 parts (98% of theory) of

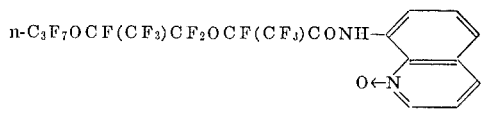

as a viscous liquid.

(E) Using the same procedure, $$n\text{-}C_3F_7O[CF(CF_3)CF_2O]_2CF(CF_3)\\CONH(CH_2)_3N(CH_3)_2$$

was oxidized to

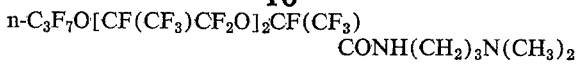

*Analysis.*—Cal'd for $C_{17}H_{13}F_{23}N_2O_5$ (percent): F, 57.2; N, 3.7. Found (percent): F, 57.0; N, 3.8.

(F) Using the same procedure, $$n\text{-}C_3F_7O[CF(CF_3)CF_2O]_6CF(CF_3)\\CONH(CH_2)_3N(CH_3)_2$$

was oxidized to

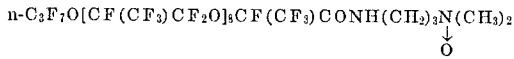

*Analysis.*—Calc'd for $C_{35}H_{13}F_{59}N_2O_{11}$ (percent): F, 63.8; N, 1.6. Found (percent): F, 63.5; N, 1.4.

Using similar oxidation procedures, the following can be prepared:

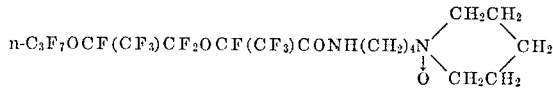

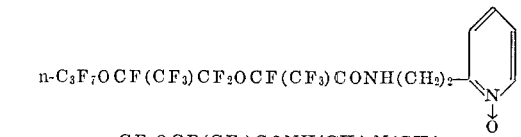

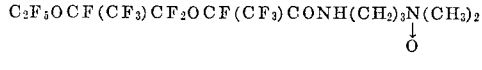

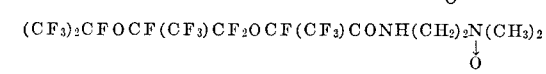

and

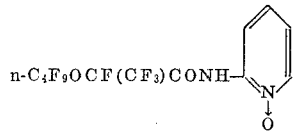

EXAMPLE 4

Utility as surface active agents was determined as follows:

Surface activities of aqueous solutions of products prepared above were measured using a Du Nooy tensiometer in the usual manner. The results are shown in the following table. Water containing no additive had a surface tension of 72 dynes per centimeter at 25° C.

TABLE

| Surface active agent | Surface tension, dynes/cm. at 25° C. Concentration, percent | | | | | | |
|---|---|---|---|---|---|---|---|
| | 0.005 | 0.01 | 0.05 | 0.1 | 0.5 | 1.0 | 10.0 |
| n-C₃F₇OCF(CF₃)CONH(CH₂)₃N(CH₃)₂ ↓ O | 68.0 | 61.5 | 45.5 | 39.5 | 30.0 | 28.5 | 25.3 |
| n-C₃F₇OCF(CF₃)CF₂OCF(CF₃)CONH(CH₂)₃N(CH₃)₂ ↓ O | 15.7 | 15.6 | 15.4 | 15.1 | 14.9 | 14.8 | 14.7 |
| n-C₃F₇OCF(CF₃)CF₂OCF(CF₃)CONH—pyridyl ↓ O | | 60.0 | 55.4 | 53.0 | 43.0 | 39.5 | 34.2 |
| n-C₃F₇OCF(CF₃)CF₂OCF(CF₃)CONH—quinolyl O←N | | 59.3 | 52.1 | 49.3 | 41.2 | 38.6 | 35.1 |

EXAMPLE 5

Utility of water-insoluble products as anticorrosion agents was determined as follows:

Two Type 1020 mild steel test coupons were each treated with a different 1.0% solution of one of the following products in trichlorotrifluoroethane for five minutes and then air dried. The products used were:

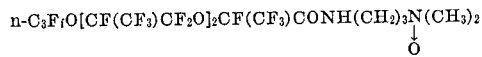

n-C$_3$F$_7$O[CF(CF$_3$)CF$_2$O]$_2$CF(CF$_3$)CONH(CH$_2$)$_3$N(CH$_3$)$_2$
$\downarrow$
O and

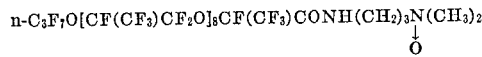

n-C$_3$F$_7$O[CF(CF$_3$)CF$_2$O]$_8$CF(CF$_3$)CONH(CH$_2$)$_3$N(CH$_3$)$_2$
$\downarrow$
O The coupons were then immersed to one-half their length in 10% aqueous hydrochloric acid and allowed to stand for five days at ambient temperature. Neither of the two coupons showed any evidence of corrosion on their surfaces which remained bright.

For comparison, another type 1020 mild steel test coupon which had not been surface treated was immersed in 10% hydrochloric acid and allowed to stand for five days at ambient temperature. The coupon turned black and was badly corroded.

EXAMPLE 6

Utility as release agents for metal surfaces was determined as follows:

Two Type 1020 mild steel test coupons were each treated with a different one of the two 1.0% trichlorotrifluoroethane solutions described in Example 5 for five minutes and air dried as before. To test the antiwetting or release properties of the treated surfaces, each treated coupon was bonded to an untreated coupon with a typical epoxy resin metal bonding agent (Shell "Epon" 828 cured with diethylenetriamine). In each case the bond could be broken easily by hand.

For comparison, two untreated Type 1020 mild steel test coupons were bonded together with the same bonding agent. The bond was very strong and could not be broken by hand.

EXAMPLE 7

Utility as release agents for glass surfaces was determined as follows:

Two glass slides were each treated with a different one of the two 1% trichlorotrifluoroethane solutions described in Example 5 for 5 minutes and air dried. The treated slides were then coated with poly(methyl 2-cyanoacrylate), which is known to be a good adhesive for glass. After setting, the adhesion of the resin coatings to the glass was tested. In both cases, the coatings were easily removed with a knife.

For comparison a similar coating was placed on an untreated glass slide. The film was strongly bonded to the glass as evidenced by the fact that it was not easily removed with a knife.

EXAMPLE 8

Usefulness as flotation agents was determined as follows:

One drop of one of the 1% trichlorotrifluoroethane solutions of Example 5 was added to each of three beakers, each containing 100 ml. of water. One drop of the other of the 1% trichlorotrifluoroethane solutions of Example 5 was also added to three different beakers, each containing 100 ml. of water. For each solution, to one beaker was added powdered Cr$_2$O$_3$, to the second was added powdered Cu$_2$O, and to the third was added powdered Fe$_2$O$_3$. For comparison, similar samples of powered Cr$_2$O$_3$, Cu$_2$O and Fe$_2$O$_3$ were also added to beakers containing 100 ml. of water, but no added solution. In all cases when the trichlorotrifluoroethane solution was present, the powdered oxide floated. When only water was present, the powdered oxide sank.

In each of the preceding examples, one may substitute the corresponding compounds containing the group R$_f$O(C$_3$F$_6$O)$_n$CF(CF$_3$)— derived from the polymerization of mixtures of hexafluoropropylene and oxygen with essentially equivalent results.

Although the invention has been described and exemplified by way of specific embodiments, it is to be understood that it is not limited thereto. As will be apparent to those skilled in the art, numerous modifications and variations of these embodiments may be made without departing from the spirit of the invention or the scope of the following claims.

The embodiments of the invention in which an exclusive property or privilege is claimed are defined as follows:

1. A perfluoroalkyl ether amidoamine oxide of the formula $$R_fO(C_3F_6O)_nCF(CF_3)CON(R')Q$$

wherein R$_f$ is a perfluoroalkyl group of 1–6 carbon atoms, $n$ is an integer of 0 to 8, R' is hydrogen or alkyl of 1–6 carbon atoms, and Q is of 3–18 carbon atoms and is the group

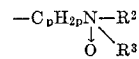

—C$_p$H$_{2p}$N—R$^2$
$\downarrow$ \\
O  R$^3$ wherein $p$ is an integer of 1–12, and R$^2$ and R$^3$ are alkyl groups of 1–4 carbon atoms.

2. A perfluoroalkyl ether amidoamine oxide of claim 1 in which the formula is

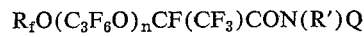

$$R_fO[CF(CF_3)CF_2O]_nCF(CF_3)CON(R')Q$$

wherein R$_f$, $n$, R' and Q are defined as in claim 1.

3. A perfluoroalkyl ether amidoamine oxide of claim 2 where $n$ is 0 or 1.

4. A perfluoroalkyl ether amidoamine oxide of claim 2 wherein R$_f$ is CF$_3$CF$_2$CF$_2$—, $n$ is 0 or 1, $p$ is 3, R$^1$ is hydrogen and R$^2$ and R$^3$ are each CH$_3$—.

5. A perfluoroalkyl ether amidoamine oxide of claim 2 wherein $n$ is an integer of 2–8.

References Cited

UNITED STATES PATENTS

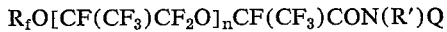

3,250,808   5/1966   Moore, Jr. _____ 260—535
2,764,603   9/1956   Ahlbrecht _____ 260—404.5

ALEX MAZEL, Primary Examiner

JOSE TOVAR, Assistant Examiner

U.S. Cl. X.R.

260—247.2, 287, 294, 295, 295.5, 326.3

PO-1050
(5/69)

UNITED STATES PATENT OFFICE
CERTIFICATE OF CORRECTION

Patent No. 3,547,995              Dated December 15, 1970

Inventor(s)  Philip L. Bartlett

It is certified that error appears in the above-identified patent and that said Letters Patent are hereby corrected as shown below:

Col. 1, line 41, the third nitrogen symbol (N) in the form should be deleted.

Col. 3, line 43 should be deleted and replaced with "prepa: by first reacting the alkyl perfluoroalkyl ether".

Col. 3, line 64, "NH'" should be deleted and $--NH_2--$ inser: in its place.

Col. 6, line 23, at the end of the line after "methyl", --alcohol-- should be inserted.

Col. 7, line 55, $F_7$ was omitted in the formula and it shou: read:

$$n\text{-}C_3F_7OCF(CF_3)CF_2OCF(CF_3)CO_2CH_3.$$

Col. 7, line 57, $F_7$ was omitted in the formula and it shou: read:

$$n\text{-}C_3F_7OCF(CF_3)CF_2OCF(CF_3)CONH(CH_2)_5N(CH_3)_2.$$

SIGNED AND
SEALED
MAR 9 1971

(SEAL)
Attest:

Edward M. Fletcher, Jr.
Attesting Officer

WILLIAM E. SCHUYLE
Commissioner of Pa